United States Patent
Banerjee

(10) Patent No.: US 9,185,114 B2
(45) Date of Patent: Nov. 10, 2015

(54) METHODS AND SYSTEMS FOR SECURE STORAGE SEGMENTATION BASED ON SECURITY CONTEXT IN A VIRTUAL ENVIRONMENT

(71) Applicant: Symantec Corporation, Mountain View, CA (US)

(72) Inventor: Deb Banerjee, Cupertino, CA (US)

(73) Assignee: SYMANTEC CORPORATION, Mountain View, CA (US)

( * ) Notice: Subject to any disclaimer, the term of this patent is extended or adjusted under 35 U.S.C. 154(b) by 72 days.

(21) Appl. No.: 13/706,256

(22) Filed: Dec. 5, 2012

(65) Prior Publication Data

US 2014/0157363 A1 Jun. 5, 2014

(51) Int. Cl.
*H04L 29/06* (2006.01)
*G06F 9/455* (2006.01)

(52) U.S. Cl.
CPC ............ *H04L 63/10* (2013.01); *G06F 9/45558* (2013.01); *H04L 63/105* (2013.01); *G06F 2009/45587* (2013.01)

(58) Field of Classification Search
None
See application file for complete search history.

(56) References Cited

U.S. PATENT DOCUMENTS

| | | | |
|---|---|---|---|
| 7,447,920 B2 | 11/2008 | Sharma et al. | |
| 2008/0046960 A1 | 2/2008 | Bade et al. | |
| 2010/0275241 A1 | 10/2010 | Srinivasan | |
| 2012/0084768 A1* | 4/2012 | Ashok et al. | 717/174 |
| 2012/0216276 A1* | 8/2012 | Regnault et al. | 726/16 |
| 2012/0303740 A1* | 11/2012 | Ferris | 709/217 |
| 2012/0304179 A1 | 11/2012 | Devarakonda et al. | |
| 2014/0059344 A1* | 2/2014 | Branton et al. | 713/165 |

OTHER PUBLICATIONS

International Search Report and Written Opinion for International (PCT) Patent Application No. PCT/US2013/072406, Mar. 19, 2014 (11 pages).

* cited by examiner

*Primary Examiner* — Harunur Rashid
*Assistant Examiner* — Andrew Steinle
(74) *Attorney, Agent, or Firm* — Lowenstein Sandler LLP

(57) ABSTRACT

A computer system identifies a request to place a workload in a hypervisor-based host. The computer system identifies a security level of the workload. The computer system identifies a security level of a storage device associated with the hypervisor-based host. If the security level of the workload corresponds to the security level of the storage device, the computer system grants the request to place the workload in the hypervisor-based host. If the security level of the workload does not correspond to the security level of the storage device, the computer system denies the request to place the workload in the hypervisor-based host.

20 Claims, 5 Drawing Sheets

METHODS AND SYSTEMS FOR SECURE STORAGE SEGMENTATION BASED ON SECURITY CONTEXT IN A VIRTUAL ENVIRONMENT

TECHNICAL FIELD

The present disclosure relates to storage in virtual environments, and more particularly, to secure storage segmentation in a virtual environment with mixed trust workloads.

BACKGROUND

Dynamic server and datacenter technology, such as infrastructure virtualization, helps businesses to reduce operating expenses, improve uptime and connectivity, and scale resources rapidly. Many organizations use virtualization techniques to create an internal, private cloud that spreads among computing, storage, and networking resources within an IT infrastructure. Other organizations may use a public Infrastructure-as-a-Service (IaaS) cloud that may accommodate multiple cloud tenants, such as competitors that subscribe to the same public IaaS cloud. Data within private or public clouds might be sensitive and organizations might wish to isolate workloads and storage devices from unauthorized parties.

SUMMARY

In one implementation, a system for associating a storage device with a workload is described. An example system may include a memory and a processing device that identifies a request to place a workload in a host. The processing device can identify a security level of the workload using the security level of the data stored in a storage device associated with that workload. The processing device also may grant the request to place the workload in the host if the security level of the host corresponds to the security level of the workload. If the security level of the host does not corresponds to the security level of the workload, the processor can deny the request to place the workload in the host. A host can have many virtual machines belonging to different workloads and can have many different storage devices attached to it.

In one implementation, the workload is an instance of a virtual machine on the host. In one implementation, the system further associates at least one virtual disk on the storage device with the host when granting the request to place the workload in the host. In one implementation, the storage device is a physical disk comprising a plurality of virtual disks used by workloads on different hosts. In one implementation, each of the workloads is assigned to one of: a cloud tenant, a cloud sub-tenant. In one implementation, the security level of the workload is identified based on at least one of: the security level of the data, input provided by a system administrator, or sensitivity of content on the storage device. In one implementation, the request to place the workload in the host is any one of an initial placement request with respect to the workload or a request to migrate the workload to the host from another host.

Further, a method for associating a host with a workload is described. In one implementation, the method includes identifying a request to place a workload in a host. The method identifies a security level of the workload. The method further identifies a security level of the host based on the risk associated with the workloads running on that host. If the security level of the workload corresponds to the security level of the host, the method grants the request to place the workload in the host. The method denies the request to place the workload in the host if the security level of the workload does not correspond to the security level of the host.

In addition, a non-transitory computer readable storage medium for associating a storage device with a workload in a virtual environment is described. An example non-transitory computer readable storage medium includes instructions that, when executed by a processing device, cause the processing device to perform a method that identifies a request to place a workload in a host. The method identifies a security level of the workload. The method further identifies a security level of the host. If the security level of the workload corresponds to the security level of the host, the method grants the request to place the workload in the host. The method denies the request to place the workload in the host if the security level of the workload does not correspond to the security level of the host.

In one implementation, a system for placing virtual disks is described. An example system may include a memory and a processing device that identifies a request to place a virtual disk from a first data store to a second data store. The processing device can identify a security level of a workload and of a host associated with the second data store. The processing device can also identify a security level of the virtual disk. The processing device can grant the request to place the virtual disk in the second data store if the security level of the host corresponds to the security level of the virtual disk. The processing device can also grant the request to place the virtual disk in the second data store if the security level of the workload corresponds to the security level of the virtual disk. If the security level of the host does not correspond to the security level of the virtual disk, the processor can deny the request to place the virtual disk in the second data store. If the security level of the workload does not correspond to with the security level of the virtual disk, the processor can deny the request to place the virtual disk in the second data store.

BRIEF DESCRIPTION OF THE DRAWINGS

The present disclosure will be understood more fully from the detailed description given below and from the accompanying drawings of various implementations of the disclosure.

DETAILED DESCRIPTION

Described herein are a method and apparatus for associating a storage device with a workload based on security considerations, according to various implementations. A virtual environment can include a cloud computing environment that hosts virtual machines, networking hardware, storage servers, and storage hardware. A cloud computing environment is hereinafter also referred to as a cloud.

A cloud is comprised of storage resources, compute resources and network resources. Storage resources can include, for example, storage systems, storage servers, storage software, storage devices, physical disks, logical disks, virtual disks, data stores, etc. A storage resource is referred to as a dedicated storage resource when it is shared based on a security policy. Compute resources can include, and are not limited to, processing devices, host machines, virtual machines, applications, memory, hypervisors, etc. The virtual machine instance can be running on a computer system (e.g., host machine running a hypervisor) in the cloud. Network resources can include, and are not limited to, network interface cards, ports, routers, switches, internet protocol addresses, network domains, etc.

The cloud can host one or more workloads. A workload is an independent service or collection of code that can be executed in an instance of a virtual machine or spread among multiple virtual machines. An application or group of applications can be referred to as a workload. Workloads are not tied to specific devices. Both public and private clouds can be organized into trust zones, where a trust zone represents a collection of workloads that share a common security level. Whether in a public or private cloud, workloads may operate in mixed trust zones such as workloads of two different security levels can run on virtual machines on the same host. In one implementation, workloads belonging to different trust zones should be isolated from each other based on security policies.

Multiple tenants can exist in a cloud. A tenant can be an entity and/or sub-entity. An entity, as referred to herein, can represent any person, a business organization such as a corporation, an educational institution such as a college and university, etc. For example, several entities may be different Enterprise companies and may store and access different data sets in the same cloud. In another example, several sub-entities may be different departments within the same entity, such as an Enterprise company, and may store and access data in the cloud.

Figure 1:
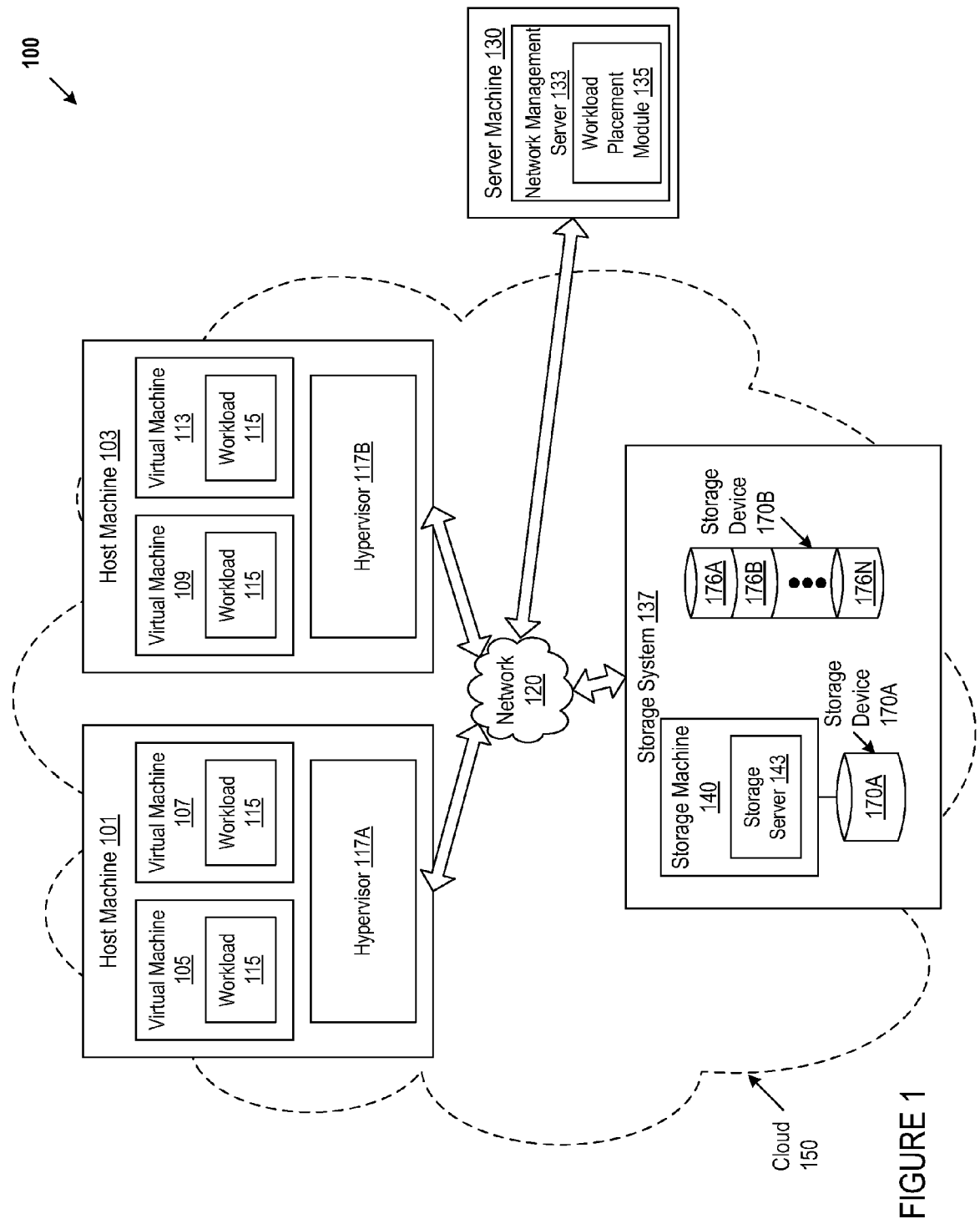
FIG. 1 illustrates example system architecture, in accordance with various implementations.

FIG. 1 is an example system architecture 100 in which implementations of the present disclosure can operate. The system architecture 100 can include a cloud 150. The cloud 150 can be a public cloud, a private cloud, or a hybrid cloud. A private cloud can include a private network. A public cloud can have an infrastructure that is made available to the general public or to a large industry group. A public cloud can be owned by an organization providing cloud services, also known as a cloud provider. A hybrid cloud can have an infrastructure that is a composition of two or more clouds (e.g., private, public) that remain unique entities, but are bound together by standardized or proprietary technology that enables data and application portability (e.g., load balancing between clouds). Multiple cloud tenants (e.g., Enterprise-1, Enterprise-2) may use a public cloud (e.g., cloud 150).

The cloud 150 can provide solutions to entities using cloud computing such as an IaaS model in which cloud providers can provide compute resources, storage resources, and networking resources to one or more entities on a subscription basis. The cloud 150 can include one or more host machines 101,103, storage system 137 and one or more storage devices 170A-B connected via a network 120. The network 120 may be a public network, a private network, or a combination thereof.

A host machine 101,103, server machine 130, and the storage machine 140 can be a server computer system, a desktop computer or any other computer system or computing device. A host machine 101,103 can run one or more virtual machines, can allocate a certain amount of its resources to each of the virtual machines (e.g., virtual machines 105,107,109,113), and can multiplex its underlying hardware platform among the virtual machines. Each virtual machine 105,107,109,113 can use the allocated resources (e.g., compute resources) to execute its guest operating system and workloads (e.g., workload 115). The software layer providing the virtualization is commonly referred to as a hypervisor 117A-B and is also known as a virtual machine monitor (VMM), a kernel-based hypervisor, or part of a host operating system. The hypervisor 117A-B can emulate the underlying hardware of the host machine (e.g., host machines 101,103), making the use of the virtual machine 105,107,109, 113 transparent to the guest operating system and the user of the host machine 101,103. The host machine 101,103 is referred to herein as a hypervisor-based host or a virtual machine host.

There can be any number of virtual machines in a cloud 150. For brevity and simplicity, four virtual machines 105, 107,109,113 are used as an example in architecture 100. Each virtual machine 105,107,109,113 may be hosted on a physical machine, such as host machines 101,103, configured as part of the cloud 150. A host machine 101,103 can run multiple virtual machines simultaneously. For example, host machine 101 may run virtual machine 105 and virtual machine 107 simultaneously, and host machine 103 may run virtual machine 109 and virtual machine 113 simultaneously.

The cloud 150 can provide virtual machines, for example, to tenants. A virtual machine 105,107,109,113 can be a software implementation of a machine (computer) that includes its own operating system (referred to as a guest operating system) and executes one or more workloads 115 or part of workload 115.

A workload 115 is a collection of cloud resources for a specified task and can refer to one or more applications executing on one or more virtual machines. Common attributes of workloads 115 include applications, data, and their availability, security and other resource requirements. Workloads 115 may be allocated dynamically on different infrastructure components based on scalability or high availability/disaster recovery (HA/DR) requirements, or to optimize utilization, for example. Workload 115 can include any type of application including, for example, a web application, a desktop application, a browser application, etc. Workload 115 can use a storage resource, such as a virtual disk 176 for storage (e.g., read, write) operations. Workloads 115 are not tied to specific devices and can be balanced or distributed across any number of hosts. Similarly, data belonging to workloads are not tied to storage servers and can move across different storage servers based on scalability or high availability/disaster recovery (HA/DR) requirements, or to optimize utilization.

In one implementation, storage system 137 includes a storage machine 140. Storage system 137 can be a cluster of one or more storage machines 140. Storage system 137 can also be a plurality of storage devices 170, such as an array of physical disks 170. Storage machine 140 can include one or more storage servers 143 and one or more storage devices 170. Storage device 170 can be segmented into a number of virtual disks, 176A, 176B-N, for example.

Users (e.g., cloud tenant users) can interact with workloads 115 executing on cloud-based virtual machines 105,107,109, 113 using client computer systems via corresponding web browser programs. There can be any number of clients. The client can be a mobile device, a PDA, a laptop, a desktop computer, or any other computing device. The client can be provided by and managed by a cloud tenant, such as an Enterprise company.

In one implementation, the cloud 150 includes one or more server machines 130 connected to the one or more host machines 101,103 and a storage system 137 via the network 120. In another implementation, the one or more server machines 130 reside outside of the cloud 150 and are connected to the one or more host machines 101,103 and storage system 137 via network 120 or another network. In one implementation, the server machine 130 is deployed and managed by the cloud 150 provider. In another implementation, the server machine 130 is deployed and managed by a tenant (e.g., Enterprise company). The server machine 130 can be hosted on one or more computing devices including server computers, gateway computers, or similar computing devices.

The server machine 130 can include a network management server 133 that provides network-accessible server-based functionality. The network management server 133 can include a workload placement module 135 to, for example, manage workload placements based on security level of a workload and security level of the host. Workload placement module 135 can control the extent of cloud infrastructure sharing. Storage management requests, such as a request to place a new workload, a request to migrate an existing workload, a request to instantiate a new data store, or a request to migrate a data store, are performed according to security levels of the workloads 115, storage devices 170 and hosts 101,103. Workload placement module 135 can intercept all requests for the virtual infrastructure (e.g., an initial workload placement request, a workload migration request, a new data store request, a data store migration request) and determine whether to permit or deny the request. Security levels can be administered across the cloud 150, or across any virtual infrastructure, such that workloads 115 and related storage resources are consistently protected as workloads 115 are motioned. Workload placement module 135 can be available on an ad hoc basis to support dynamically constructed relationships between virtual resources such as workloads, virtual networks, virtual storage, and virtual machines. As a workload 115 is migrated or scaled up, the security level associated with that workload can be used to determine new hosts or new storage servers (e.g., a virtual disk on storage device 170). One implementation of workload placement module 135 is described in greater detail in conjunction with FIG. 2.

Security levels of workloads can affect how one or more storage devices 170 are shared among workloads 115. The security level of the workload can be based on the compute resources, applications, and tenant data (e.g., users, departments, files, the contents of files, or regulatory compliance, etc.). For example, the security level of the workload can be based on the sensitivity of a virtual machine, a process run by the workload, data processed by the workload, a tenant using the workload, a sub-tenant using the workload, or a user of the workload. For example, a workload used by the CEO of an organization can involve sensitive applications, files and/or data, and can be classified with a "high" security level.

Security levels can also be used to describe the sensitivity of data within a storage device 170. Storage devices 170 can have differing security levels. When storage device 170 stores sensitive information, it can have a heightened security level. Sensitive information can be information that would be detrimental to an entity if an unauthorized party gained access to the information. Information intended for an executive team of an organization, for example, is sensitive if others outside of the executive team are not authorized to access the information. Information of a clout tenant can also be sensitive if another cloud tenant does not have permission to access the information. For example, a secret recipe for a popular beverage is sensitive if the owner of the recipe would suffer harm if a competing beverage company gained access to the secret recipe. Sensitivity can be judged on a sliding scale where one end of the scale represents little or no sensitivity (e.g., little or no harm if unauthorized party gains access) and the other end of the scale represents high sensitivity.

A security level can be a tag that identifies or classifies a virtual machine, an operation performed on the virtual machine, a workload, a storage server, a storage device, data stored on the storage device, etc. A security level can also be assigned for a cloud tenant, a cloud sub-tenant, a cloud tenant user, etc.

Workloads 115 operating within the cloud 150 can have differing security levels. Security level of a workload can be identified based on input provided by a user or can be based on the security level of a storage device 170. The security level of a workload 115 can describe the sensitivity of the workload. The security level can use any means of classifying or tagging workload 115. The security level can be a number range, such as 1-10, where 1 is a low security level and 10 is a high security level. For example, a workload that operates within a DMZ can have a "1" security level because the DMZ can present an elevated risk of exposing an Enterprise's external services to another, untrusted network, such as the Internet. Workloads 115 with a first security level, for example, can be isolated or prevented from sharing a storage device 170 that has a second security level.

The security level of the storage device can classify the sensitivity of storage resources (e.g., data, files, or the contents of files, etc.). For example, the security level of the storage device can classify the sensitivity of data or files stored on a storage resource, such as a storage device. For example, Storage-Device-873628 stores highly sensitive data and may be classified with a "high" security level. Security level of a storage device can be identified based on input provided by a user, the security level of a workload 115 that uses the storage device 170, or by scanning (e.g., searching) a potential target storage device for sensitive or confidential data. The security level of storage device 170 can use external classification tags, for example, that keep track of the data context obtained by scanning backup files.

Security levels can be used to manage cloud resources used by different cloud tenants. For example, all resources of Enterprise-1 have a security level and resources of Enterprise-2 have a different security level. Using these two different security levels, workload placement module 135 does not permit a workload for Enterprise-1 and a workload from Enterprise-2 to share a storage device or share a host. In another example, a workload of Enterprise-1 has a "low" security level and a workload of Enterprise-2 also has a "low" sensitivity level. Workload placement module 135 can permit these two workloads 115 to share a storage device because they both have a "low" security level. In another example, workloads 115 of different cloud tenants never share a storage device 170.

Cloud tenants may implement security levels that influence workload placement requests. For example, Enterprise-1 and Enterprise-2 may be competitors using the same public cloud. Enterprise-1 may have a security level specifying that any storage operation (e.g., initial workload placement, workload migration) for any user from Enterprise-1 should use a dedicated storage resource in the cloud. In another example, workloads or data associated with a sub-entity of an Enterprise should use a dedicated storage resource in the cloud. In a further example, Enterprise data is categorized by a classification and only data with a particular classification can share a storage resource in the cloud.

Figure 2:
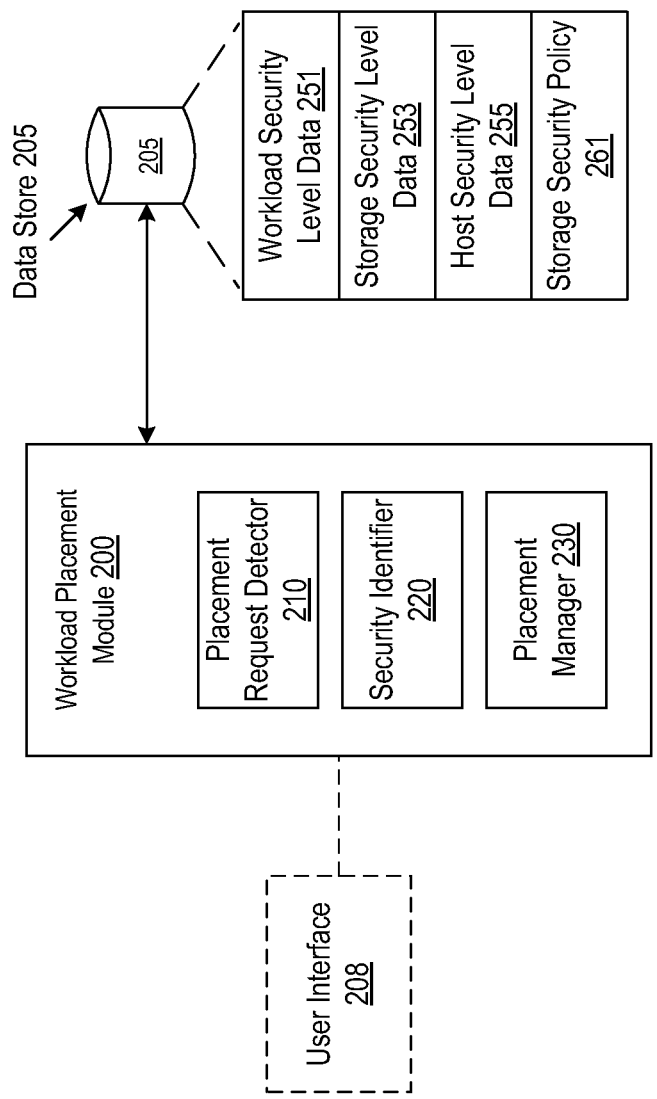
FIG. 2 is a block diagram of an implementation of a workload placement module.

FIG. 2 is a block diagram of one implementation of a workload placement module 200. The workload placement module 200 may be the same as the workload placement module 135 in a server machine 130 of FIG. 1. In one implementation, the workload placement module 200 resides outside the cloud and intercepts workload placement requests. Workload placement module 200 manages placements and can isolate storage resources. In another implementation, the workload placement module 200 is hosted within the cloud.

Workload placement module 200 can allow a particular configuration based on a security level of the workload and a security level of the host (e.g., for placing a new workload, for migrating an existing workload). Workload placement module 200 can identify which storage devices; for example, can be mounted on which hosts based on security levels of the workloads, the hosts, and of the storage devices. In an example, a workload that is classified as being sensitive is not allowed to share a storage device or a host with a public-facing, non-sensitive workload, such as a web server workload on a DMZ. In addition, when placing a workload, workload placement module 200 assigns a storage device to the workload.

The workload placement module 200 can include data store 205, placement request detector 210, storage security identifier, and a placement manager 230. In one embodiment, a user interface 208 is communicably connected to workload placement module 200. The sub-modules can be combined together or separated in further sub-modules, according to a particular implementation.

A data store 205 can be a persistent storage unit. A persistent storage unit can be a local storage unit or a remote storage unit. Persistent storage units can be a magnetic storage unit, optical storage unit, solid state storage unit, electronic storage units (main memory), or similar storage unit. Persistent storage units can be a monolithic device or a distributed set of devices. A 'set', as used herein, refers to any positive whole number of items. Data store 205 can store workload security level data 251, storage security level data 253, host security level data 255, and storage security policy 261.

User interface 208 can receive input from a system administrator specifying one or more security levels of cloud resources (e.g., a workload, a storage resource and/or tenant data). The user interface 208 can be a graphical user interface, a command line interface, etc. For example, an Enterprise system administrator may specify a security level for a workload or a storage device, via the user interface 208, in terms of the tenant, the sub-tenant, and/or the user of an instance of a virtual machine in the cloud. For example, Enterprise company, BigBoxRetailer, Inc. may be a tenant of a cloud. The Chief Financial Officer (CFO) of BigBoxRetailer, Inc is a user in the Finance Department at BigBoxRetailer, Inc. and is assigned (e.g., logged into) Virtual-Machine-Instance-1. The system administrator can specify a high security level for Virtual-Machine-Instance-1 and can likewise intend a storage device 170 to be associated only with workloads or virtual machines of users from the Finance Department. The system administrator can provide a security level that corresponds to, or is consistent with, the sensitivity level of data or files associated with the CFO. When the CFO travels to another geographical area, his workload should be migrated to a host in the new geographical region. This new host has its own set of storage devices, each segmented into multiple virtual disks. The CFO workload can only use a virtual disk of a storage device with a security level that corresponds to the CFO's workload.

Workload security level data 251 includes a security level for each workload 115, which can be recorded based on user input, such as from a system administrator using user interface 208 to input the workload security level data 251. Workload security level data 251 can also be identified based on a sensitivity of a task performed by workload 115 (e.g., a security level of a user requesting a task or a user receiving a result of the task, the sensitivity of information processed by the task, etc.), a security level of a host running the workload, a security level of a virtual machine including the workload, etc.

Storage security level data 253 includes a security level for one or more storage devices 170. Data store 205 can obtain storage security level data 253 based on input provided by a user (e.g., from a system administrator via user interface 208), an existing security level of the storage device (e.g., a security level of a virtual disk on the storage device), or the security level of a workload associated with the storage device. A security level can also be identified based on a scan of a potential target storage device for sensitive data. The scan can be performed using keywords (e.g., confidential, sensitive, etc.), fingerprints of documents classified as sensitive or confidential, an index of a database storing confidential information (e.g., social security numbers of employees, patients or customers, credit card numbers, etc.), etc.

Host security level data 255 includes a security level for each host 101, 103, which can be recorded based on user input, such as from a system administrator using user interface 208 to input the host security level data 255. Host security level can depend on the risk associated with the workloads running on that host. Host security level data 255 can also be identified based on a sensitivity of a task performed by workloads 115 running on the host (e.g., a security level of a user requesting a task or a user receiving a result of the task, the sensitivity of information processed by the task, etc.), a security level of a virtual machine running the workload, a security level of a storage device mounted to the host, etc.

Placement request detector 210 can intercept a request to place a workload in a host, such as a hypervisor-based host. A request may be an initial workload placement or a request to migrate a workload from one host to another host. The request may be issued by, for example, a system administrator, a host machine (e.g., upon detecting that it is being over-utilized, a host controller (e.g., as part of resource balancing), etc. Placement request detector 210 can identify a storage device associated with the host where the workload should be placed.

Security identifier 220 identifies the security level of the workload, host and/or storage device. Security identifier 220 queries workload security level data 251 to obtain the security level for the workload. Security identifier 220 queries storage security level data 253 to obtain the security level for the storage device. If the security level for the storage device is not present in the storage security level data 253, storage security identifier 220 can perform a storage security identification routine, one embodiment of which is described in further detail below in conjunction with FIG. 3. Security identifier 220 queries host security level data 255 to obtain the security level for the host.

Placement manager 230 identifies the security level of the workload and verifies that the security level of the workload corresponds to, or is consistent with, the security level of the target storage device to determine whether the placement is allowable. Placement manager 230 obtains the security level of the workload from workload security level data 251. If the security level of the workload corresponds to the security level of the storage device, then the placement manager 230 can grant the request. If the security level of the workload does not correspond to or is not consistent with the security level of the storage device, then the placement manager 230 can deny the request.

In one embodiment, the placement manager 230 can maintain storage security policy 261 that specifies which combinations of cloud resources (e.g., workloads and storage devices) are allowable. The placement manager 230 can use the workload security level data 251, the storage security level data 253, and the host security level data 255 to define the storage security policy 261. The storage security policy 261 can be used to instruct the management server, for example, on how to carry out the workload placement request. For example, storage security policy 261 may not permit a workload used by the Finance Department of Enterpise-1 to share a storage device by any other Department of Enterprise-1. Under this policy, workloads for other Departments of Enterprise-1, or workloads within the Finance Department but with different security levels, may not share a storage device. The storage security policy 261 can be stored in the data store 205. In another example, placement manager 230 allocates to Enterprise-1 all storage as a dedicated storage resource (e.g., storage server, storage device, etc.). Placement manager 230 can identify dedicated storage resources (e.g., storage server, storage device, etc.) in the cloud, and identify the dedicated storage resource to perform the requested storage operation.

Figure 3:
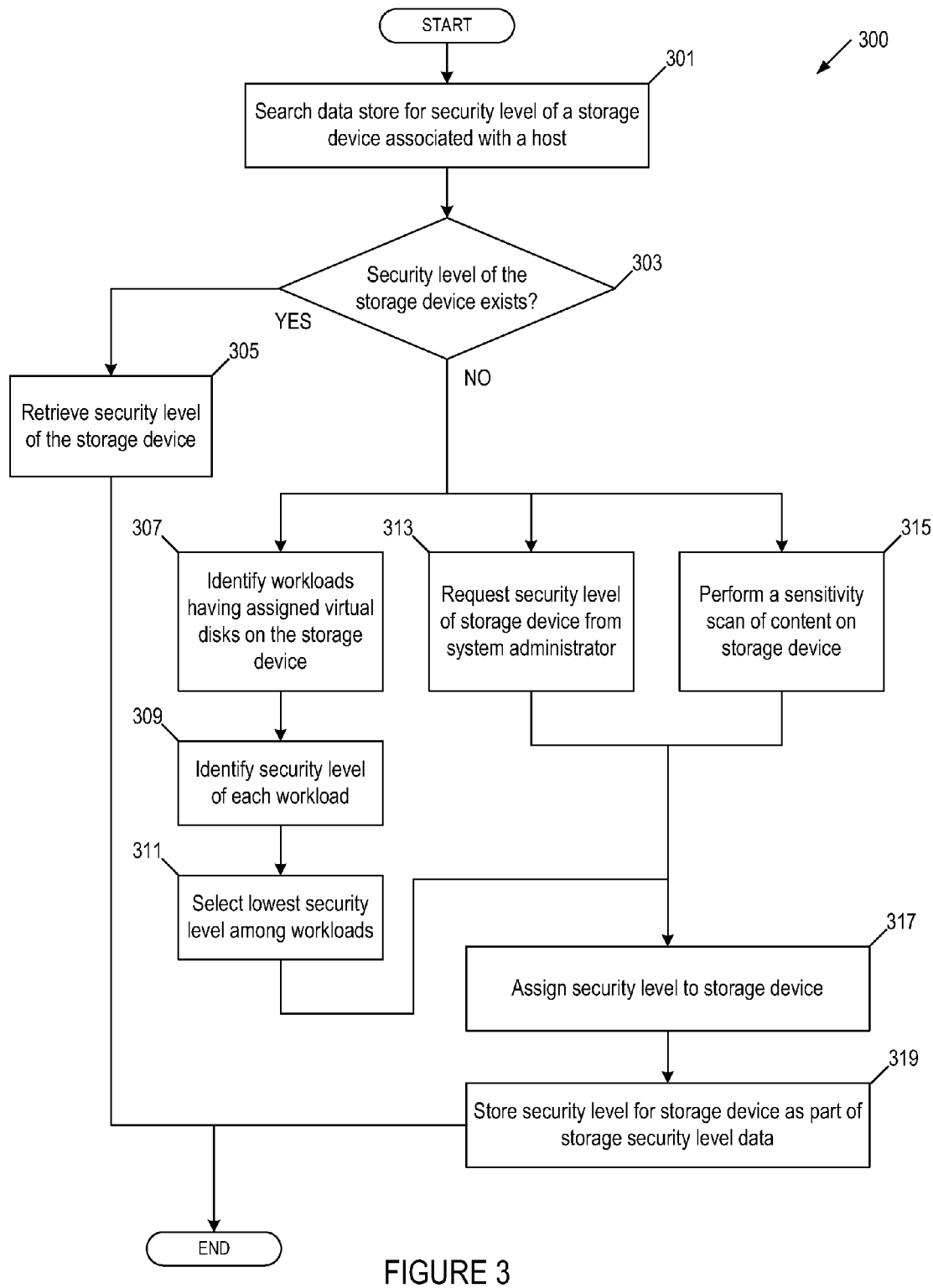
FIG. 3 is a flow diagram illustrating an implementation for a method for identifying a security level of a storage device.

FIG. 3 is a flow diagram of an implementation of a method 300 for identifying a storage security level. Method 300 can be performed by processing logic that can comprise hardware (e.g., circuitry, dedicated logic, programmable logic, microcode, etc.), software (e.g., instructions run on a processing device), or a combination thereof. In one implementation, method 300 is performed by workload placement module 135 in server machine 130 of FIG. 1.

At block 301, processing logic searches a data store (e.g., data store 205) for a security level of a storage device associated with a host. The security level of the storage device can represent a sensitivity level of data stored on the storage device, as described herein.

At block 303, processing logic determines if the security level of the storage device is in the data store. If yes, then method 300 proceeds to block 305, where the processing logic retrieves the security level of the storage device from the data store and method 300 ends.

If at block 303, processing logic determines that the security level of the storage device is not in the data store, it can proceed to either block 307, or block 313 or block 315 depending on the configuration specifying what mechanism should be used for determining the security level of the storage device. In some embodiments, all or some of these mechanisms should be used to determine a combined security level of the storage device.

At block 307, processing logic identifies workloads that have virtual disks on the storage device. If the storage device has more than one virtual disks, the processing logic can identify the associated workload(s).

Once associated workloads are identified, processing logic can identify the security level of the workload(s) or users of workloads having an assigned virtual disk on the storage device at block 309.

At block 311, processing logic selects the security level of the workload. If the storage device has multiple virtual disks associated with multiple workloads, then processing logic selects the lowest security level among the identified security levels. Method 300 then proceeds to block 317, as described herein.

At block 313, processing logic requests the security level of the storage device from a system administrator via a user interface as described herein. Upon receiving the security level of the storage device from the system administrator, method 300 proceeds to block 317.

At block 315, processing logic performs a sensitivity scan of content on the storage device, such as using a data loss prevention (DLP) system. The DLP system may classify the sensitivity level of data or a file stored on disks in the cloud. For example, the DLP system may identify that Disk-124966, for example, stores highly sensitive data and that Disk-54324 stores sensitive-low data. Various classification identifiers can be used to describe the sensitivity level. For example, sensitivity levels can include, and are not limited to, 'sensitive-high', 'sensitive-medium', and 'sensitive-low.' In another example, sensitivity levels can include, and are not limited to, 'sensitive-1', 'sensitive-2', and 'sensitive-n', where a scale may represents degree or level of sensitivity.

At block 317 processing logic has identified a security level from blocks 311, 313 or 315. Processing logic assigns the identified security level to the storage device (e.g., dedicated, shared, encrypted, shared-encrypted, dedicated-encrypted, etc.).

At block 319 processing logic stores the identified security level in a storage medium (e.g., as storage security level data 253 in data store 205). For example, the identified security level may describe that Storage-Device-395832 may be configured to store highly sensitive data and may be configured to be dedicated to one cloud tenant. In another example, the identified security level may describe that Disk-987123 may be configured to store data for multiple cloud tenants, each with the same security level.

Figure 4:
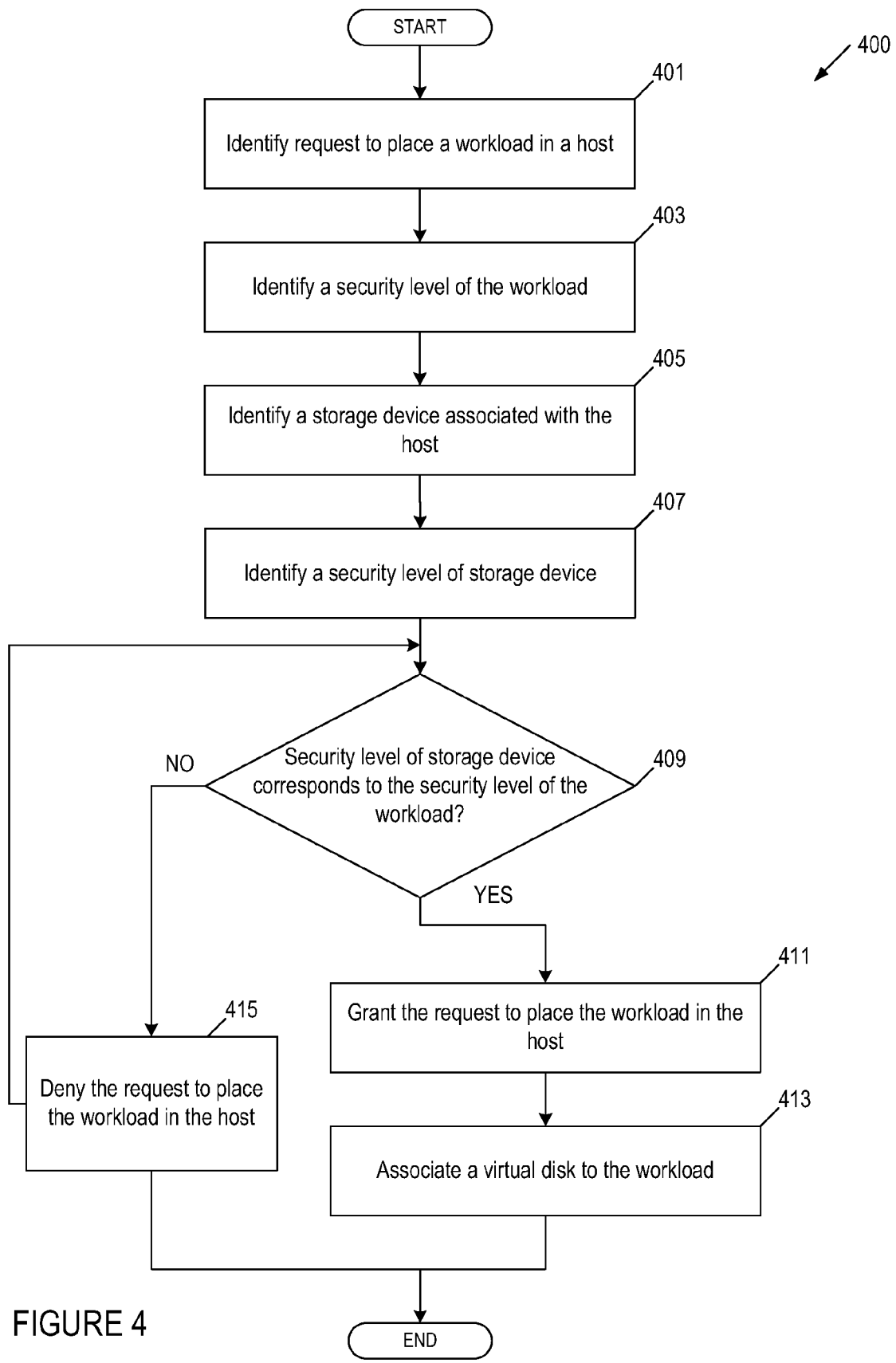
FIG. 4 is a flow diagram illustrating an implementation for a method for handling a request to place a workload in a virtual computing environment.

FIG. 4 is a flow diagram of an implementation of a method 400 for handling a request to place a workload in a host in a virtual environment. Method 400 can be performed by processing logic that can comprise hardware (e.g., circuitry, dedicated logic, programmable logic, microcode, etc.), software (e.g., instructions run on a processing device), or a combination thereof. In one implementation, method 400 is performed by a server machine 130 of FIG. 1.

At block 401, processing logic identifies a request to place a workload in a host. The request can include a request to create a new workload or to migrate an existing workload.

At block 403, processing logic identifies a security level of the workload. The security level can indicate the sensitivity of the workload and processes, applications, data, users, tenants, etc. associated with the workload. The security level of the workload can come from user input, such as a system administrator, sensitivity of the task to be performed by the workload, the security level of one or more hosts associated with the workload, or other parameters discussed above. Processing logic can query a data store (e.g., workload security level data 251 in data store 205) that is coupled to the workload placement module to identify the security level of the workload. For example, processing logic may use a workload identifier in the query to locate the security level that corresponds to the workload identifier.

At block 405, processing logic identifies a storage device associated with the host. A host can have one or more storage devices associated with the host based, for example, on an assignment provided by a system administrator.

At block 407, processing logic identifies a security level of the storage device. The security level of a storage device can be identified based on input provided by a user, the security level of a workload that uses the storage device, or by scan of a potential target storage device by a computer system. If multiple storages devices are associated with the host, a security level for each storage device is identified. Processing logic can search storage security level data in the data store that describes the security level (e.g., dedicated, shared, encrypted, shared-encrypted, dedicated-encrypted, etc.) for a corresponding storage device. For example, the security level for Virtual-Machine-23456 may be "high" because Virtual-Machine-23456 is being used by the Chief Financial Officer of BigBoxRetailer, Inc.

At block 409, processing logic determines whether the security level of the storage device corresponds to the security level of the workload. Processing logic compares the security level of the workload identified in block 403 to the security level of the storage device identified in block 407, or applies a storage security policy to make this determination.

If the security level of the workload corresponds to the security level of the storage device, then processing logic grants the request to place the workload in the host, as in block 411 (e.g., placing a new workload, migrating an existing workload). In block 413, processing logic assigns a virtual disk from the storage device to the workload.

If the security level of the workload does not correspond to the security level of the storage device, then processing logic denies the request to place the workload in the host, as in block 415. When a host has multiple associated storage devices, processing logic can repeat block 409 for each associated storage device. If no storage devices have a security level that corresponds to the security level of the workload, then method 400 ends.

Figure 5:
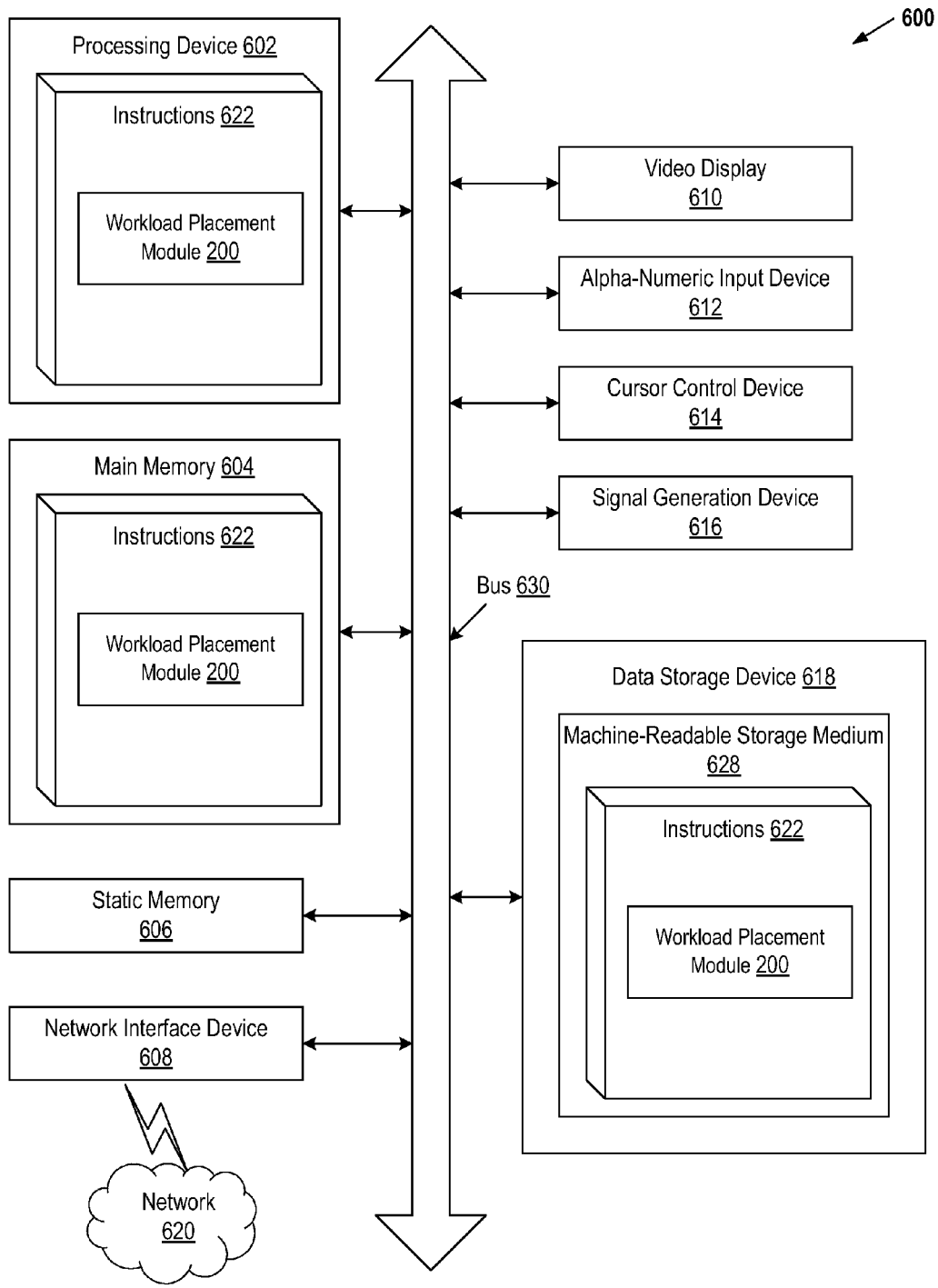
FIG. 5 is a block diagram of an example computer system that may perform one or more of the operations described herein.

FIG. 5 illustrates an example machine of a computer system 600 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or DRAM (RDRAM), etc.), a static memory 606 (e.g., flash memory, static random access memory (SRAM), etc.), and a data storage device 618, which communicate with each other via a bus 630.

Processing device 602 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute instructions 622 for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a machine-readable storage medium 628 (also known as a computer-readable medium) on which is stored one or more sets of instructions 622 or software embodying any one or more of the methodologies or functions described herein. The instructions 622 may also reside, completely or at least partially, within the main memory 604 and/or within the processing device 602 during execution thereof by the computer system 600, the main memory 604 and the processing device 602 also constituting machine-readable storage media.

In one implementation, the instructions 622 include instructions for a storage security policy module (e.g., storage security module 200 of FIG. 2) and/or a storage security policy module (e.g., storage security module 400 of FIG. 4) and/or a software library containing methods that call modules in a storage security policy module and/or a storage security module. While the machine-readable storage medium 628 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "sending" or "creating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A method comprising:
    identifying, by a processing device, a request to place a workload in a hypervisor-based host server;
    identifying a security level of the workload;
    scanning, by the processing device, a storage device associated with the hypervisor-based host server to detect a security level of one or more contents of the storage device;
    identifying, by the processing device, a lowest security level from the detected security level of the one or more contents of the storage device;
    assigning, by the processing device, a security level of the storage device at or below the lowest security level;
    granting, by the processing device, the request to place the workload in the hypervisor-based host server when the security level of the workload corresponds to the security level of the storage device;
    denying, by the processing device, the request to place the workload in the hypervisor-based host server when the security level of the workload does not correspond to the security level of the storage device; and
    causing the workload to be placed in the hypervisor-based host server when the security level of the workload corresponds to the security level of the storage device.

2. The method of claim 1, wherein the workload is an instance of a virtual machine on the hypervisor-based host server.

3. The method of claim 1 wherein granting the request to place the workload in the hypervisor-based host server comprises:
    associating at least one virtual disk on the storage device with the workload.

4. The method of claim 3, wherein the storage device is a physical disk comprising a plurality of virtual disks used by workloads on different hypervisor-based servers.

5. The method of claim 4, wherein each of the workloads is assigned to one of: a cloud tenant, a cloud sub-tenant, or an operation performed for a cloud tenant or sub-tenant.

6. The method of claim 1, wherein the security level of the storage device is identified based on at least one of: the security level of the workload or input provided by a system administrator.

7. The method of claim 1, wherein the request to place the workload in the hypervisor-based host server is any one of an initial placement request with respect to the workload or a request to migrate the workload to the hypervisor-based host server from another hypervisor-based host server.

8. A system comprising:
    a memory; and
    a processing device coupled with the memory to:
        identify a request to place a workload in a hypervisor-based host server;
        identify a security level of the workload;
        scan a storage device associated with the hypervisor-based host server to detect a security level of one or more contents of the storage device;
        identify a lowest security level from the detected security level of the one or more contents of the storage device;
        assign a security level of the storage device at or below the lowest security level;
        grant the request to place the workload in the hypervisor-based host server when the security level of the workload corresponds to the security level of the storage device;
        deny the request to place the workload in the hypervisor-based host server when the security level of the workload does not correspond to the security level of the storage device; and
        cause the workload to be placed in the hypervisor-based host server when the security level of the workload corresponds to the security level of the storage device.

9. The system of claim 8, wherein the workload is an instance of a virtual machine on the hypervisor-based host server.

10. The system of claim 8, wherein when granting the request to place the workload in the hypervisor-based host server comprises, the processing device further to:
    associate at least one virtual disk on the storage device with the workload.

11. The system of claim 10, wherein the storage device is a physical disk comprising a plurality of virtual disks used by workloads on different hypervisor-based servers.

12. The system of claim 11, wherein each of the workloads is assigned to one of: a cloud tenant, a cloud sub-tenant, or an operation performed for a cloud tenant or sub-tenant.

13. The system of claim 8, wherein the security level of the storage device is identified based on at least one of: the security level of the workload or input provided by a system administrator.

14. The system of claim 8, wherein the request to place the workload in the hypervisor-based host server is any one of an initial placement request with respect to the workload or a request to migrate the workload to the hypervisor-based host server from another hypervisor-based host server.

15. A non-transitory computer readable storage medium including instructions that, when executed by a processing device, cause the processing device to perform operations comprising:

identifying a request to place a workload in a hypervisor-based host server;

identifying a security level of the workload;

scanning, by a processing device, a storage device associated with the hypervisor-based host server to detect a security level of one or more contents of the storage device;

identifying, by the processing device, a lowest security level from the detected security level of the one or more contents of the storage device;

assigning, by the processing device, a security level of the storage device at or below the lowest security level;

granting, by the processing device, the request to place the workload in the hypervisor-based host server when the security level of the workload corresponds to the security level of the storage device;

denying, by the processing device, the request to place the workload in the hypervisor-based host server when the security level of the workload does not correspond to the security level of the storage device; and causing the workload to be placed in the hypervisor-based host server when the security level of the workload corresponds to the security level of the storage device.

16. The non-transitory computer readable storage medium of claim 15, wherein the workload is an instance of a virtual machine on the hypervisor-based host server, and wherein the request to place the workload in the hypervisor-based host server is any one of an initial placement request with respect to the workload or a request to migrate the workload to the hypervisor-based host server from another hypervisor-based host server.

17. The non-transitory computer readable storage medium of claim 15, wherein when granting the request to place the workload in the hypervisor-based host server, the processing device further to perform:

associating at least one virtual disk on the storage device with the workload.

18. The non-transitory computer readable storage medium of claim 17, wherein the storage device is a physical disk comprising a plurality of virtual disks used by workloads on different hypervisor-based server.

19. The non-transitory computer readable storage medium of claim 18, wherein each of the workloads is assigned to one of: a cloud tenant, a cloud sub-tenant, or an operation performed for a cloud tenant or sub-tenant.

20. The non-transitory computer readable storage medium of claim 15, wherein the security level of the storage device is identified based on at least one of: the security level of the workload or input provided by a system administrator.

\* \* \* \* \*